(No Model.) 2 Sheets—Sheet 1.
J. SCHOFIELD & H. W. CARTER.
COMBINATION TOOL.
No. 310,152. Patented Dec. 30, 1884.
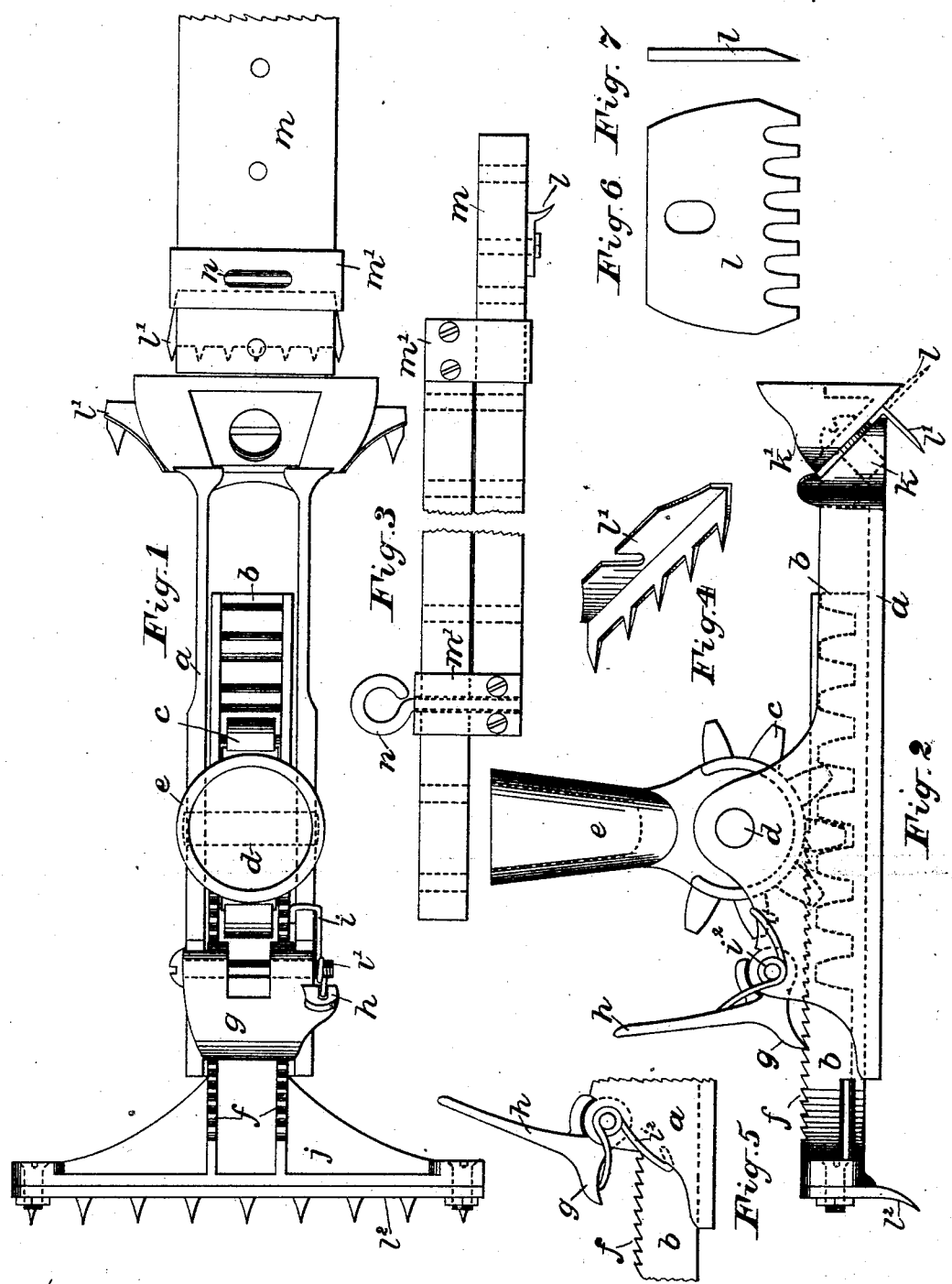
Witnesses:
Isaac D. Clark
Frank Williams
Inventor
John Schofield
Henry W. Carter
per Wm. Zimmerman.
Attorney.

(No Model.) 2 Sheets—Sheet 2.
J. SCHOFIELD & H. W. CARTER.
COMBINATION TOOL.
No. 310,152. Patented Dec. 30, 1884.
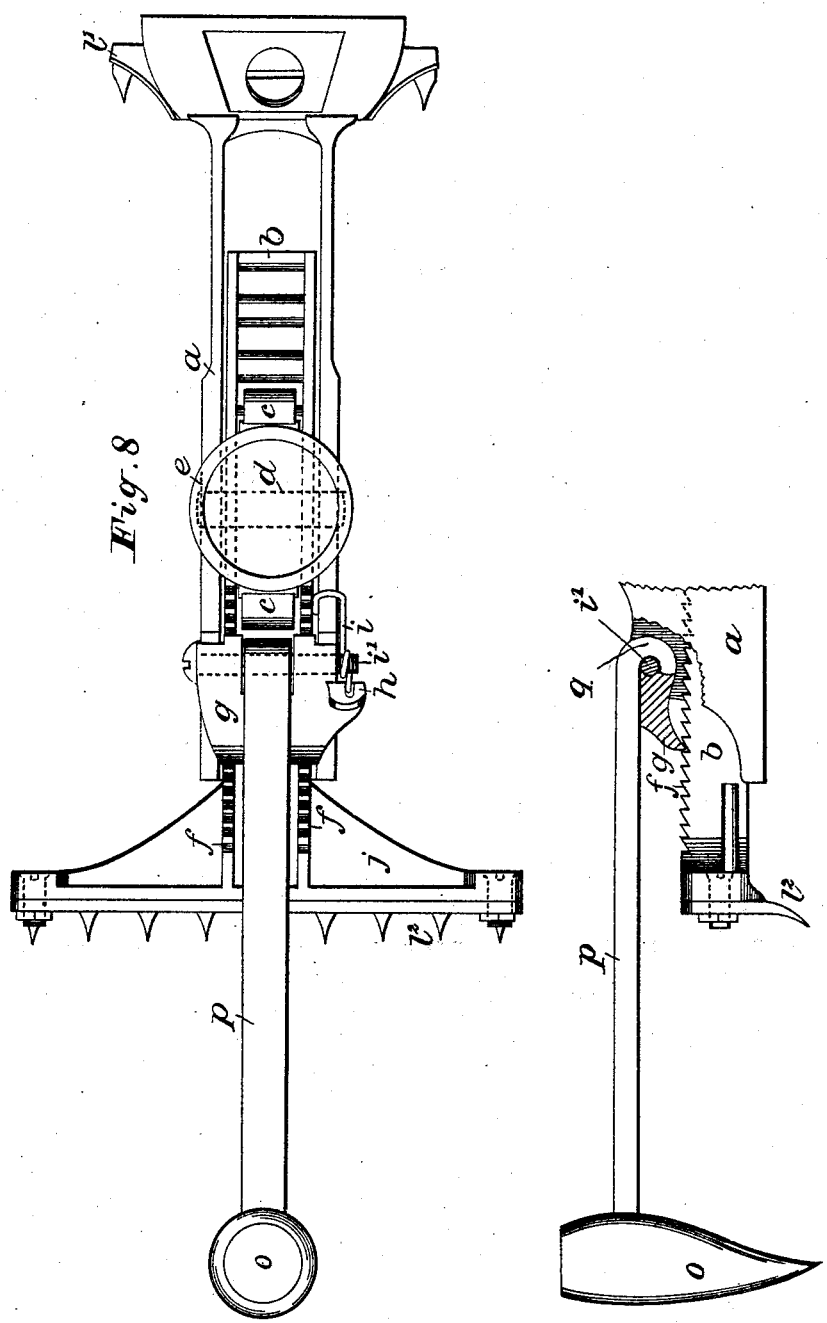
Witnesses
Isaac D. Clark
Frank Williams
Inventor
John Schofield
Henry W. Carter.
per Wm Zimmerman,
Attorney.

UNITED STATES PATENT OFFICE.

JOHN SCHOFIELD AND HENRY W. CARTER, OF CHICAGO, ILLINOIS.

COMBINATION-TOOL.

SPECIFICATION forming part of Letters Patent No. 310,152, dated December 30, 1884.

Application filed June 16, 1884. (No model.)

*To all whom it may concern:*

Be it known that we, JOHN SCHOFIELD and HENRY W. CARTER, citizens of the United States, residing at Chicago, in the county of Cook and State of Illinois, have invented certain new and useful Improvements in Combination-Tools, which are fully set forth in the following specification, reference being had to the accompanying drawings, forming a part hereof, and in which—

Figure 1 is a plan view of our device as a carpet-stretcher, abutting against a part of a rod provided with a rake or stop. Fig. 2 is a side elevation of the same without the rod. Fig. 3 is a side view of the adjustable rod with stop. Fig. 4 shows the stop or rake $l'$ in perspective. Fig. 5 is a side view of the pawl or dog $g$, with spring $i^2$ to raise it from the ratchet $f$. Fig. 6 is a front, and Fig. 7 an end, view of a claw or dog forming part of our device. Fig. 8 shows in plan the carpet-stretcher used with a dog in front when used as a carpet-stretcher. Fig. 9 is a side view of the dog, showing how it is attached to the pin $i'$.

Like letters of reference indicate like parts.

The object of our invention is to construct a combination-tool which shall form a carpet-stretcher, door-fastener, lifting-jack, floor-clamp, and other like devices, this being an improvement on John Schofield's former Letters Patent No. 201,709. The base $a$ is a channeled casting, in which plays a rack, $b$, actuated by a pinion, $c$, turning on a pin, $d$. Said pinion has a socket, $e$, for a lever to work the pinion, said pinion and its socket forming preferably one piece. One or both the upper edges of the front end of the rack $b$ are formed into ratchet-teeth $f$, against which works a pawl or detent, $g$, having a lever, $h$, held upon said ratchets by a spring, $i$. The upper or outer end of the rack $b$ is formed into a head, $j$, and the lower end of the base is beveled at an angle of about forty-five degrees, as shown, and has attached to it by a screw, $k$, a foot, $k'$. In this form, as now described, our device forms a lifting-jack, &c.

To make a floor-clamp, the foot $k'$ is removed, and in its place is secured the toothed blade $l$ by the screw $k$, instead of a hinge, as formerly. This apparatus is then set upon a floor-joist, with its head $j$ against the floor, and the teeth of $l$ on the joist, into which they cut and form a strong hold.

To convert the apparatus into a carpet-stretcher, attach the rake $l'$ in place of the blade $l$, (shown in dotted outline in Fig. 2,) and fasten a rake, $l^2$, upon the end of the head $j$; also put the foot $k'$ on, as shown; place the foot $k'$ against the end of a rod or brace reaching to the opposite side of the room, or, preferably, against an adjustable brace, $m$; then catch the teeth of $l^2$ in the carpet and push the head $j$ outward, and when its motion is completed catch the teeth of the rake $l'$ in the carpet; they will hold what has been drawn out, and repeat the operation if necessary. The rake $l'$ may also be attached to the brace $m$, instead of the base $a$, and work equally well. The rod or brace $m$ is preferably formed of two sticks which slide upon each other, and are held together by two clamps, $m'$, and are adjusted to length by a pin, $n$, through one of the clamps and holes in the sticks.

The dog $g$ is not useful in carpet-stretching, and to avoid the necessity of working it a spring, $i^2$, is put in place of the spring $i$, which throws it up from the ratchets $f$.

For a door-fastener the teeth of the dog $l$ are made round and sharp points, to prevent injury to carpets.

In place of the rod $m$ to hold the stretcher in its place, a dog is attached to the pin $i'$ and driven into the floor in front of the machine. It consists of the spur $o$, rod $p$, and hook $q$.

What we claim is—

1. In combination with the base $a$, having inclined end, screw $k$, rack $b$, pinion $c$, and rakes $l'$ $l^2$, the dog $o$ $p$ $q$, substantially as specified.

2. In combination with the base $a$, having inclined end, screw $k$, rack $b$, and pinion $c$, the dog $l$, substantially as specified.

3. In combination with the base $a$, having inclined end, screw, $k$, dog $l$, rack $b$, and pinion $c$, the dog $g$, substantially as specified.

4. In combination with the pinion $c$, rack $b$, and base having inclined end, the screw $k$ and base $k'$, substantially as specified.

JOHN SCHOFIELD.
HENRY W. CARTER.

Witnesses:
WM. ZIMMERMAN,
ISAAC D. CLARK.